Patented Mar. 30, 1943

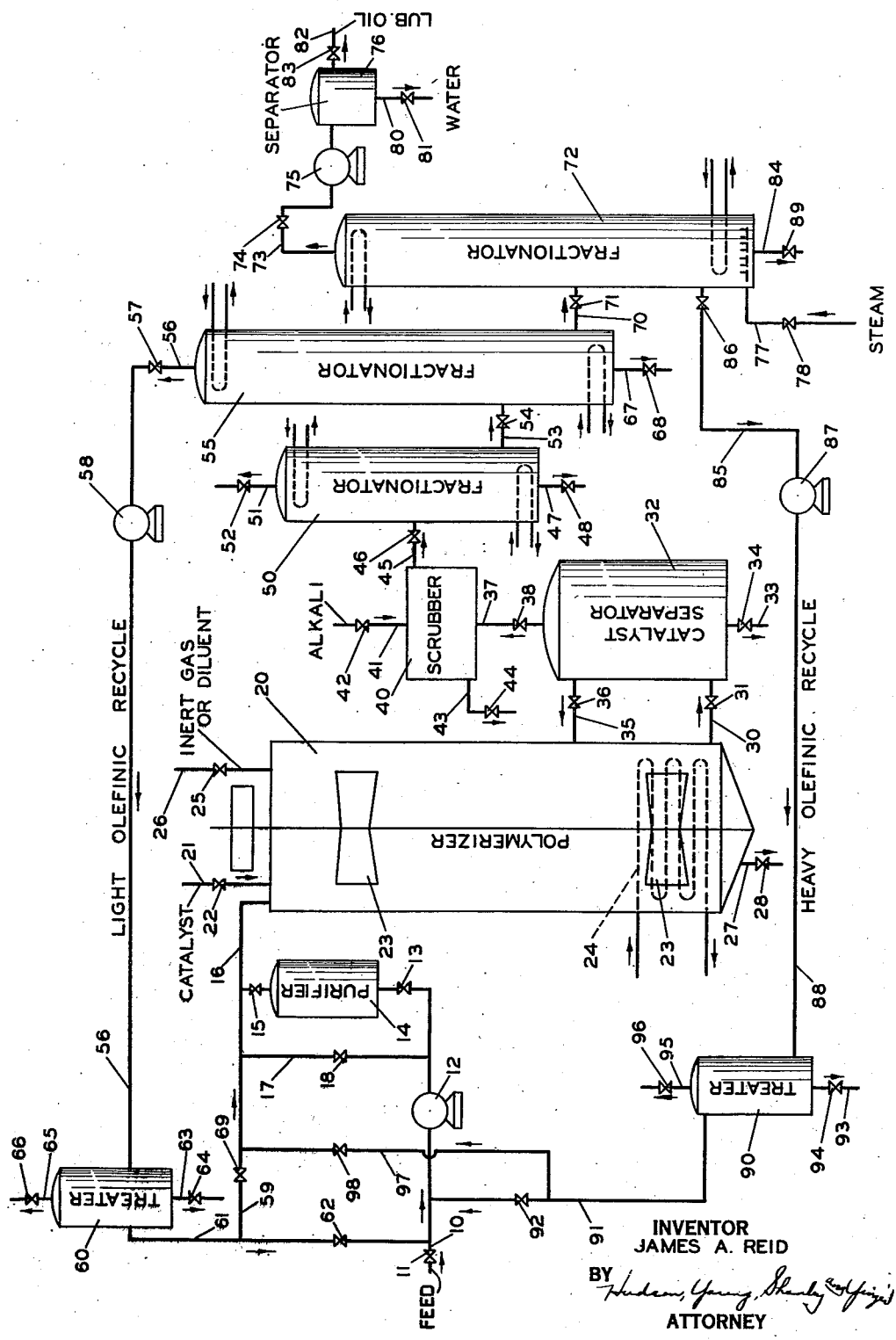

2,315,080

UNITED STATES PATENT OFFICE 2,315,080

PROCESS FOR MANUFACTURE OF VISCOUS POLYMERS

James A. Reid, Bartlesville, Okla., assignor to Phillips Petroleum Company, a corporation of Delaware Application March 3, 1941, Serial No. 381,565

11 Claims. (Cl. 196—10)

This invention relates to the manufacture of oils from hydrocarbons of lower molecular weight, and more specifically to the production of oils within a selected range of molecular weights through the controlled reaction of olefins and their polymers.

It has hitherto been proposed that olefins be subjected to the action of catalysts for the production of oils such as are suitable for use in lubricants. The olefin charge stocks for the manufacture of such oils include normally gaseous olefins and olefins of higher molecular weight, such as those from dehydrogenated naphthas and waxes, cracked distillates, and similar products, either in relatively pure states or admixed with inert diluents. Metal halide catalysts such as aluminum chloride and bromide, boron fluoride, zirconium chloride and bromide, titanium chloride, and the like, are preferred catalysts for use in such processes, although no particular one is the full equivalent of any other, and other catalysts may, at times, also be used.

I have found that the molecular weights and viscosities of the hydrocarbon products resulting from a reaction of olefins under particular conditions in these systems vary widely. I have also found that the molecular weight distribution of products from suitable polymerization systems may be represented by means of an arithmetic probability curve. In general, at the lower reaction temperatures the average molecular weight of the product is higher, and the proportion of very high molecular weight viscous oil is increased. At higher reaction temperatures, the proportion of very high molecular weight polymer is reduced, and the proportion of polymer of low molecular weight and viscosity is increased. As a consequence, the proportion of polymer in a polymerization product within a selected range of molecular weight is relatively small. For example, from twenty to fifty per cent of the polymers are normally within the range of viscosity making them suitable for use in the preparation of lubricants for internal combustion engines.

The desirability of so controlling the polymerization that only polymers within a selected range of molecular weight or viscosity are formed is evident, since loss of valuable olefinic material results from conversion to products which are not in the desired range or for which little or no use exists.

This invention comprises essentially in one modification the catalytic conversion of olefins to polymers in the presence of metal halide type catalysts under such conditions, to be more fully discussed, that a favorable yield of hydrocarbons within a desired and preselected range of viscosity is secured, the separation of the desired products and the recycle of the polymers of higher and/or lower viscosities for further conversion with a fresh charge stock to form additional products in the desired range.

I have now discovered that after removal from the total product mixture, of the fraction or fractions which constitute the desired product, the remaining simple polymer fractions of both lower and higher molecular weights, or viscosities, may be returned to the polymerization step for conversion with added monomeric olefins to form a product containing substantially the same proportion of desired viscous fractions as existed in the first polymer mixture. In this manner, substantially complete conversion of low boiling olefins to polymers within a preselected range of viscosity is secured by the multiple recycle of undesired heavy, as well as light, polymer fractions with added increments of monomeric olefin. This selective conversion has been elucidated in part by the discovery that in a system for the preparation of intermediate and higher viscosity polymers, lower viscosity polymers as well as monomeric olefins undergo polymerization to intermediate and higher viscosity polymers, and that in a system for preparation of intermediate viscosity polymers, higher viscosity polymers undergo some sort of concomitant reaction to form desirable products of intermediate viscosity. The simultaneous occurrence of these two types of reactions yields an apparent conversion of monomeric olefin in a mixture of polymers of relatively high and low viscosity to products within the viscosity range desired.

It is an object of my invention to provide a process whereby olefins are converted predominantly to products within a preselected range of molecular weight.

Another object of this invention is to convert olefins to valuable polymers without the formation of undesired products.

A more specific object of this invention is to provide a process for converting olefins to polymers having properties which make them suitable for use in the preparation of lubricants.

Other objects and advantages of my invention will be seen from the accompanying disclosure and discussion.

The yield of desired product fraction from a single batch or portion of composite product is dependent principally on the limits of the desired molecular weight or viscosity range and the conditions of polymerization. In the manufacture of viscous hydrocarbons for use in the preparation of lubricating oils, I have found that ordinarily from 20 to 50 per cent of the product can be within the desired range, although in the preparation of particular products greater or less yields per pass may result through the recycle of the simple olefin polymers both of lower and higher molecular weight, and a high proportion, from 60 to 90 per cent, of the olefin charge may then be ultimately converted to hydrocarbons within the preselected range of molecular weight. Many polymerization catalysts can be used under conditions such that the reaction promoted is essentially one of simple polymerization, uncomplicated by side reactions, or secondary reactions, such as molecular rearrangements, cyclization, hydrogenation-dehydrogenation, and the like. Such catalysts and conditions are to be preferred.

When some olefin polymerization catalysts such as zirconium tetrachloride are used the conditions, under which a total polymer product with a molecular weight distribution which follows an arithmetic probability curve is formed, cover a rather wide range, while with other olefin polymerization catalysts which tend to form non-aliphatic or cyclic products such as aluminum chloride, the range of polymerization conditions, within which substantially aliphatic polymers are formed with a molecular weight distribution which follows an arithmetic probability curve, are much more limited. I prefer to operate the polymerization step of my process with such a polymerization catalyst and within such a range of polymerization conditions that a substantial proportion of a viscous polymeric product will be produced which will have a molecular weight distribution which can be represented by an arithmetic probability curve. When using those catalysts for which only a narrow range of polymerization conditions will produce such products, it may be found that conditions somewhat to one side or the other of this range will produce appreciably larger yelds of desired product with only small yields of undesired products. The practice of my invention with such polymerization conditions, with suitable treatment of recycled material to remove undesired material is contemplated.

Although the products of such side or secondary reactions tend to build up in a recycle system such as the one herein disclosed, when the conditions are such that these take place to only a limited extent such products will be contained to a small extent in the desired fraction recovered as a product of the process, and their removal in this manner will often keep them from building up within the system to excessive amounts. However, if it is found expedient for other reasons to operate with catalysts, or under conditions, such that larger amounts of these less desirable materials are formed, the recycle stream or streams may be treated to remove all or most of these materials and thus prohibit or limit their accumulation within the system.

The reactions are usually performed most satisfactorily within the temperature range of about 30 to 215° F., although temperatures as high as 300° F. or as low as —120° F. may be used for the conversion of particular olefins or the production of special products. Sufficient pressure should be maintained in the system to keep the catalyst and the reacting hydrocarbons substantially in liquid phase. It is desirable in most cases to provide sufficient catalyst concentration and contact time that a predominant proportion of the olefin charge becomes converted. This time may vary from a half hour or less to a period of six to fifteen hours with the higher molecular weight straight chain olefins.

The method used for segregating the desired product fraction is dependent upon the characteristics of the polymer. Distillation, selective solvent extraction or adsorption, limited selective addition or conversion reactions, and so forth, are useful in particular applications. In the production of lubricating oils, for example, the low molecular weight polymers may be very satisfactorily removed by fractional distillation at reduced pressure. Some of the lubricant fractions may be distilled at reduced pressure, leaving a viscous residue. In other cases it is desirable to separate the less viscous or lower molecular weight polymers by selective extraction or adsorption.

The reaction product in the desired viscosity range which has been separated from the product mixture may subsequently be subjected to additional treatment to convert it into a more useful product. In general, it may be used as a charge stock for synthesis of a wide variety of derivatives and synthetic chemicals. For use as a component of a lubricating oil, it is usually desirable to hydrogenate the desired product fraction to increase its stability toward oxidation, the conditions of hydrogenation being so adjusted that substantial decomposition is not produced. The hydrogenated oil may be blended with various other stocks, or further treated by a selective separation step, such as distillation. To the hydrogenated product may be added other synthetic or natural oils, wear control agents, oxidation and sludge inhibitors, and the like.

Simple polymers of somewhat lower molecular weight than that suitable for the direct manufacture of lubricants may be employed to alkylate aromatic hydrocarbons, such as benzene or toluene, or their derivatives to form oils of high solvent capacity, using catalysts such as sulfuric acid, hydrofluoric acid, aluminum chloride and other metal halide catalysts.

The drawing which forms a part of this specification, represents schematically a preferred arrangement of apparatus for the production of selected viscous hydrocarbons according to one modification of the present invention.

Referring now to the drawing, an olefinic hydrocarbon material is introduced into the system through pipe 10 and valve 11, either in a pure state or in admixture with a low boiling non-reactive diluent such as a paraffin hydrocarbon. When such olefins are produced by dehydrogenation they will generally be accompanied by at least a certain amount of the unreacted paraffins. The charge stock, comprising such fresh olefins together with heavy recycled simple olefin polymers, and if desired similar light polymers as will be discussed more fully, is passed by pump 12 preferably through valve 13 to dehydrator or purifier 14, and thence through pipe 16 and valve 15 to polymerizer or reactor 20. If it is unnecessary or undesirable in any particular instance to use the purifier 14, it may be by-passed through pipe 17 and valve 18.

From pipe 16 the charge is admitted to polymerizer or reactor 20, with or without preheating or other temperature adjustment as may be found necessary or desirable, wherein it is contacted with a suitable metal halide catalyst. When a large kettle-like reactor is used, such as the one diagrammatically illustrated, the catalyst may be introduced from any desirable source through means such as pipe 21, controlled by valve 22, as a solid, liquid, or gas, as the case may be, and in solution or suspension in an inert material when such is desirable. The reacting mixture is vigorously agitated, as by the paddles 23, and heat of reaction is preferably removed and the temperature controlled by circulating a cooling medium through coil 24. The reactor is preferably not maintained liquid full, although the reaction should be carried out in liquid phase with a major part of the reactant and reacting hydrocarbons present as a liquid. Since the desired viscous product has practically a negligible vapor pressure at the reaction temperature, sufficient low boiling inert material such as propane, butane, or pentane, or the like should be present to maintain in the reactor a positive pressure with respect to the atmosphere, and such material may be separately added, or removed, during the reaction through valve 25 in pipe 26.

A stream of the reacted material, with the catalyst in suspension or solution, is passed from reactor 20 through pipe 30 and valve 31 to the catalyst separator 32, wherein a major portion of the catalyst is separated from the hydrocarbon material, and can be discharged from the system through pipe 33 and valve 34, or returned wholly or in part to the reactor 20 through pipe 35 and valve 36. The actual type and manner of separation effected in separator 32 will be determined by the catalytic material employed to effect the polymerization. When using a catalyst such as zirconium tetrachloride, the catalyst may be filtered from the hydrocarbon material in which it is suspended by simple means adapted to such materials, and the catalyst, associated if desired with a small amount of hydrocarbon material to form a slurry, can be returned at least in part to reactor 20 through pipe 35. When using a relatively volatile metal halide catalyst such as boron fluoride, tin tetrachloride, or titanium tetrachloride, or the like, it may be separated by distillation from the heavier hydrocarbon, and returned to the reactor as indicated. Light hydrocarbons separated along with such volatile catalyst may be returned to the reactor along with the catalyst, or may be discharged from the system through means not shown. The functions of the separator 32 may also include means for treating sludged catalysts, or those in other inactive forms, or such materials may be removed through pipe 33.

After separation of the major part of the catalyst, the hydrocarbon material is passed through pipe 37 and valve 38 to scrubber 40, wherein it is subjected to a treatment for removing remaining traces of catalyst and any acid material, as by washing with an alkaline solution, or treatment with a solid material such as soda ash or the like. Such material may be introduced through pipe 41 and valve 42, and the solution and such impurities, or reaction products thereof, removed through pipe 43 and valve 44. The purified hydrocarbon material is then passed through pipe 45 and valve 46 to fractionating means 50, which may consist of a simple fractionating column, with suitable bubble trays, heating means for the bottom and cooling and refluxing means for the top, or somewhat more complex fractionating equipment if the circumstances demand it. The principal material removed comprises essentially low boiling, relative inert material which is not preferably directly recycled to the reactor, such as light paraffin hydrocarbons, and is removed as an overhead product through pipe 51 and valve 52. The residual material, consisting principally of heavy hydrocarbons formed in the polymerization step, is passed through pipe 53 and valve 54 to fractionating means 55, which may be a simple fractionating column or a more complex combination of equipment as discussed in connection with fractionating means 50. From the hydrocarbon material passed to fractionating means 55 is separated a light hydrocarbon fraction comprising hydrocarbons produced in the polymerization step and having molecular weights, or viscosities, too low to be included in the lubricating range product. This light product is passed as a distillate fraction through pipe 56 and valve 57 by pump 58 to storage and/or treating means 60. The residue, which contains the desired product along with heavier material, is passed through pipe 70 and valve 71 to fractionating means 72, which may also be simple or consist of combined equipment, as is necessary. The desired hydrocarbon product, comprising one or more hydrocarbon fractions produced by polymerization in reactor 20 and having viscosities and viscosity characteristics in the range desired for the product of the process, is removed as a distillate product through pipe 73 controlled by a valve 74, and is passed by pump 75 to separator or storage means 76.

The fractionations in means 55 and 72 are preferably carried out at relatively low pressures and preferably, especially in 72, at subatmospheric pressures. This may be facilitated by means of suitable pumping equipment, illustrated by pumps 58 and 75, and may be accompanied by steam distillation or the like, as by the injection of steam into the fractionating means 72 through pipe 77 and valve 78. In such a case, a separation between condensed water and oil takes place in separator 76, and water is withdrawn through pipe 80 and valve 81, while the desired hydrocarbon material is withdrawn through pipe 82 and valve 83.

A residual hydrocarbon fraction, containing olefin polymers too heavy or viscous for inclusion in the desired product, is recovered from a low point of fractionating means 72, and is passed through pipe 85 and valve 86 by pump 87 to storage and/or treating means 90. This separation of desired product from the residue may be accomplished in some instances more advantageously through the use of selective solvents, selective adsorbents, or by a selective reaction and segregation of the reaction product.

As previously discussed, the hydrocarbon material produced by polymerization of simple olefins in the presence of a catalyst such as zirconium tetrachloride is almost entirely composed of simple olefin polymers. In such cases the storage and treating means 60 and 90 will serve primarily as storage, and the material passing through pipes 56 and/or 88 can be returned to the polymerization with little, if any additional treatment. Thus light polymers separated through pipe 56 are passed from 60 through pipe 61 to polymerizer 20 either through valve 62 to pipe 10 or through pipe 59 and valve 69 to pipes 17 and 16, and heavy, viscous polymers separated as residual material through pipe 88 are passed from 90 through pipe 91 to polymerizer 20 either through valve 92 to pipe 10 or through pipe 97 and valve 98 to pipes 17 and 16. However in many cases when a catalyst such as aluminum chloride is used, especially at somewhat elevated temperatures, a certain amount of hydrocarbon material other than simple olefin polymers is produced by side reactions such as cyclization, isomerization, and the like, as previously mentioned. In order to realize the greatest benefits from my invention it is more desirable that the recycle material comprise essentially simple olefin polymers, and in such cases the recycle material should be treated to remove at least an appreciable part of the hydrocarbons that are not simple olefin polymers. Such treatment is included in the function of treating means 60 and 90, and in most instances consists of a selective solvent extraction adapted to separate cyclic hydrocarbons from aliphatic hydrocarbons. The purified simple olefin polymers are then passed to reactor 20, while the hydrocarbons removed therefrom are separated from the process, as through pipe 63 and valve 64, and/or through pipe 93 and valve 94. At times, when the production of such undesirable material is not great, effective control of its concentration may be carried out by recycling only a portion of the light or heavy hydrocarbon material, discharging from the system another portion. Other means may be determined by trial and applied by one skilled in the art for any particular modification. If the viscous hydrocarbon residue passing through pipe 88 contains heavy sludge, or the like, this material should be removed even when simple olefin polymers are the principal hydrocarbon components. Heavier undesirable material formed in the reaction may be removed from the system by any one or by a combination of the following means: pipe 27 and valve 28 from reactor 20; pipe 47 and valve 48 from fractionating means 50; pipe 67 and valve 68 from fractionating means 55; pipe 84 and valve 89 from fractionating means 72. Other material lighter than the desired product may be removed from the system by means of pipe 65 and valve 66 and/or pipe 95 and valve 96

The materials which may be utilized as charge stocks for this system include the aliphatic olefins which contain three or more carbon atoms per molecule. Ethylene is generally quite resistant to reaction, so that reaction conditions which will cause it to react generally also promote an undue formation of hydrocarbons which are not simple olefin polymers, although with some catalysts it enters into reaction to form such desirable hydrocarbons if other low boiling olefins are also present and reacted. The olefins may be obtained in a relatively pure state by dehydration of the appropriate alcohols, dehydrogenation of the corresponding paraffins, depolymerization or cracking of heavier olefins or polymers from another process, or the like. On a commercial scale, the olefins are preferably manufactured by dehydrogenation of paraffin hydrocarbons. The lower boiling olefins such as propylene and isobutylene may be prepared by thermal or catalytic treatment of corresponding paraffin hydrocarbons, while higher molecular weight olefins may be prepared either by thermal treatment of paraffins to produce lighter olefins or by catalytic dehydrogenation of higher paraffins, such as those found in natural gasoline, with the formation of olefins having predominantly the same number of carbon atoms in the molecule as the original paraffins. Selected fractions of olefin-containing refinery products, such as the products from cracking stills, may also be used as charge stocks.

I have found that the presence in the charge stock of moisture, most oxygen compounds, such as alcohols and ethers, sulfur compounds such as mercaptans and thiophene, alkaline nitrogen compounds, and in some cases compounds containing halogens, tend to deactivate the catalyst and promote undesirable side reactions, so as to alter adversely the characteristics, quality, and yield of the desired product. The substantial absence of these compounds from the charge mixture is essential to continued satisfactory operation of the process, so that in most cases it will be necessary to use some means such as purifier 14. The polymerization of olefins in my process is also to be performed in the substantial absence of added aromatic hydrocarbons. The diolefins such as butadiene are also undesirable in the charge stock, and other nonolefinic unsaturates should also be removed. The operation of purifier 14 will depend to a certain extent upon the contaminant which is to be removed. When the charge stock is produced by dehydrogenation, it may contain traces of diolefins or acetylenes which can be removed by mild polymerizing agents, such as dilute mineral acids, fuller's earth, bauxite, etc. Adsorbents, such as dehydrated bauxite, silica gel, activated charcoal, etc. may be used to remove many sulfur compounds, water, alcohols, ethers, and the like. With some sulfur compounds, decomposition may be a part of the removal, followed by removal of hydrogen sulfide, or similar product, by appropriate means. Halogen compounds may also be removed by adsorption, or by chemical reaction. The specific process to be used for any particular situation can be readily determined by trial, and applied, by one skilled in the art.

Many variations in the apparatus or operation of this process may be desirable in specific embodiments. Two or more reactors may be used, or only a single one as shown may be used. A volatile diluent may be evaporated from the reaction mixture to aid in the control of the reaction temperature. If desired tube coil reactors may be used, with suitable apparatus or flow for maintaining an intimate association of catalyst and reactants, and for effecting a continuous physical removal of the catalyst from the effluent with recycle of a part or portion of it as shown. Light olefinic products may be removed directly, by additional means not shown, from fractionating means 55, or through pipe 65, as the source of hydrocarbons possessing very specific properties.

The following examples are given to indicate application of this process. Any specific limitations of conditions which are recited are not necessarily to be construed as indicating limitations of my invention.

*Example I*

Isobutylene dissolved in isobutane as diluent, together with recycled polymer, was charged as a liquid to a reactor containing zirconium tetrachloride catalyst. The reacting mixture was agitated for approximately 1½ hours, while the temperature was maintained at about 130° F. The product was withdrawn from the reactor through a filter which retained most of the catalyst in the reaction chamber for further use. After the product had been washed with a hot caustic solution to remove traces of catalyst and acidic materials, it was placed in a distillation apparatus and the isobutane diluent was removed. The polymers boiling below 635° F. were fractionated from the residue at reduced pressure and were returned to the polymerization reactor. The polymer boiling between 635° F. and approximately 1020° F. (corrected to N. T. P.) was distilled at low pressure with the aid of steam, leaving a viscous residue which was returned for reaction with additional isobutylene. The selected intermediate vacuum- and steam-distilled polymer fraction, constituting about 30 per cent of the polymer mixture, was then hydrogenated to yield a base stock for lubricating oils in the SAE 30 viscosity range. Through recycle of the polymers boiling below 635° F. and above 1020° F. (corrected to normal temperature and pressure), a total of about 75 per cent by weight of the isobutylene charged was ultimately converted to the desired product.

Example II

The olefins containing six and more carbon atoms per molecule, resulting from dehydrogenation of a natural gasoline containing predominantly hexanes, heptanes, and octanes, may be polymerized with both light and heavy recycled polymer in liquid phase at about 160° F. and a reaction time of approximately three hours, using aluminum chloride as catalyst. After the polymers are separated from the diluent, those having molecular weights between 168 and 350 are separated by distillation at reduced pressure, and are returned to the reactor for further polymerization. The residue is separated by means of solvent extraction with a butyl alcohol mixture into an oil, the viscosity of which is within the SAE 60 range, and a viscous residue. The viscous residue is also recycled to the polymerization reactor for conversion. The SAE 60 oil is hydrogenated and blended with anti-oxidants and wear-control agents. The resultant product which is obtained in 65 per cent yield is very resistant to decomposition or formation of residue in use as an aircraft engine lubricant.

Example III

A mixture of olefins and paraffins containing nine to fourteen carbon atoms per molecule which result from dehydrogenation of a waxy petroleum distillate, from which the diolefins have been removed, together with recycled polymer, may be treated in liquid phase at about 185° F. with zirconium chloride. The polymerization is permitted to proceed for about five hours, until substantially all of the charge has become polymerized. After separation of the catalyst and acidic materials, the paraffinic diluent is distilled from the polymer. The polymers boiling below about 600° F. (corrected to normal temperature and pressure), distilled at reduced pressure, are hydrogenated to make a component of a lubricating oil, while higher boiling polymers are returned to the polymerization step along with fresh charge.

Example IV

A solution of pentenes and hexenes in paraffin hydrocarbons of corresponding boiling range is mixed with ten per cent titanium tetrachloride at about 140° F. After about three hours the product and catalyst are removed from the reactor. The paraffin hydrocarbons are removed by distillation at slightly reduced pressure, maintaining the residue at a temperature not in excess of about 170° F. The pressure is then reduced somewhat further and the titanium tetrachloride is distilled off and returned to the polymerization reactor, together with the polymer boiling below 500° F. The temperature of the liquid is not permitted to exceed 185° F. in the distillation until substantially all of the titanium tetrachloride had been distilled. The polymer boiling between 500 and 670° F. (N. T. P.) is segregated for use in alkylating an aromatic hydrocarbon. The residue is separated by distillation at low pressure with steam into a fraction for use in a lubricant blend, and a residue, part of which is returned for reaction in the polymerization reactor. A part of the residual product is used, after hydrogenation, as a blending agent. Approximately 80 per cent of the olefin is ultimately converted to useful product in this process.

These examples are here recorded to illustrate specific applications of my process and do not necessarily limit its scope of applicability.

I claim:

1. A process for the polymerization of olefins to form viscous hydrocarbons within a preselected range of viscosity and adapted for use in the preparation of lubricating oils, comprising reacting an olefin hydrocarbon comprising monomeric olefins in the presence of a metal halide polymerization catalyst under suitable conditions of pressure, temperature and contact time to yield a product containing relatively viscous polymers, said temperature lying within the range of 30 to 215° F., separating from the catalyst effluent hydrocarbons in said preselected viscosity range, separating also polymers having lower and higher viscosities, and returning said polymers of lower and higher viscosities for reaction with additional amounts of said olefin charge under the original conditions of reaction to form additional material within the selected range of viscosity.

2. A process for the conversion of olefins to viscous polymers suitable for use in the preparation of lubricating oils and boiling between 635 and 1020° F. (corrected to N. T. P.), comprising reacting an olefin hydrocarbon comprising monomeric olefins in the presence of a metal halide polymerization catalyst at a temperature between 30 and 215° F., and under sufficient pressure to maintain the reactants substantially in liquid phase, for a time sufficient to effect a major conversion of monomeric olefins to yield a product containing viscous polymers in a desired viscosity range and boiling between 635 and 1020° F. (corrected to N. T. P.), separating from the effluent of the catalyst polymers in said desired range and removing the same from the process, separating also polymers of lower viscosities and polymers of higher viscosities, and returning said polymers of lower and higher viscosities for reaction with additional amounts of said olefin charge under the original conditions of reaction to form additional material within the desired range.

3. A process for the conversion of normally gaseous monomeric olefins into polymers within a preselected range of viscosity and adapted for use in the preparation of lubricating oils, comprising reacting a charge comprising said olefin hydrocarbons in the presence of a metal halide polymerization catalyst, capable of polymerizing olefins to form aliphatic polymers having viscosity characteristics of lubricating oil, under suitable conditions of pressure, temperature and contact time to yield a product containing relatively viscous polymers, said temperature lying within the range of 130 to 185° F., separating from the catalyst effluent viscous polymers in a desired viscosity range, separating also polymers having lower and higher viscosities, and returning said polymers of lower and higher viscosities for reaction with additional amounts of said normally gaseous olefin charge under the original conditions of reaction to form additional material within the selected range of viscosity.

4. A process for the conversion of olefins into viscous polymers within a preselected viscosity range and adapted for use in the preparation of lubricating oils, comprising reacting an olefin charge comprising monomeric olefins in the presence of a zirconium tetrachloride catalyst at a temperature between about 30 and 215° F., under sufficient pressure to maintain the reactants substantially in liquid phase and for a time sufficient to effect a conversion of a major part of monomeric olefin to yield a product containing viscous polymers a substantial part of which are in said preselected viscosity range, separating from the catalyst effluent polymers in said preselected viscosity range, separating also simple olefin polymers of higher and lower viscosities, and returning said simple olefin polymers of lower and higher viscosities for reaction with additional amounts of said olefin charge under the original conditions of reaction to form additional hydrocarbons within the preselected range.

5. A process for the conversion of olefins into viscous polymers within a preselected viscosity range and adapted for use in the preparation of lubricating oils, comprising reacting an olefin charge comprising monomeric olefins in the presence of an aluminum chloride catalyst at a temperature between about 30 and 215° F., under sufficient pressure to maintain the reactants substantially in liquid phase and for a time sufficient to effect a conversion of a major part of monomeric olefin to yield a product containing viscous polymers a substantial part of which are in said preselected viscosity range, separating from the catalyst effluent polymers in said preselected viscosity range, separating also simple olefin polymers of higher and lower viscosities and returning said simple olefin polymers of lower and higher viscosities for reaction with additional amounts of said olefin charge under the original conditions of reaction to form additional hydrocarbons within said preselected range.

6. A process for the polymerization of olefin hydrocarbons into a viscous hydrocarbon fraction adapted to be a component of a lubricating oil, which comprises polymerizing a low boiling monomeric olefin hydrocarbon material in the presence of a zirconium tetrachloride catalyst at a temperature between 30 and 215° F., under a pressure sufficient to maintain the hydrocarbon material substantially in liquid phase and for a period of time sufficient to form viscous polymers a substantial part of which are within a viscosity range suitable for a component of lubricating oil, separating from the catalyst effluent a hydrocarbon fraction comprising said polymers and removing same from the process, separating also a hydrocarbon fraction comprising lower viscosity polymers and a hydrocarbon fraction comprising higher viscosity polymers, and admixing at least portions of both said fractions with said low boiling monomeric olefin hydrocarbon material charged to the process.

7. A process for the polymerization of olefin hydrocarbons into a viscous hydrocarbon fraction adapted to be a component of a lubricating oil, which comprises polymerizing a low boiling monomeric olefin hydrocarbon material in the presence of an aluminum chloride catalyst at a temperature between 30 and 215° F., under a pressure sufficient to maintain the hydrocarbon material substantially in liquid phase and for a period of time sufficient to form viscous polymers a substantial part of which are within a viscosity range suitable for a component of lubricating oil, separating from the catalyst effluent a hydrocarbon fraction comprising said polymers and removing same from the process, separating also a hydrocarbon fraction comprising lower viscosity polymers and a hydrocarbon fraction comprising higher viscosity polymers, and admixing at least portions of both said fractions with said low boiling monomeric olefin hydrocarbon material charged to the process.

8. The process for the polymerization of low boiling monomeric olefins to polymers within a limited viscosity range and suitable for use as a lubricating oil stock, which comprises polymerizing said olefins in liquid phase in the presence of a metal halide polymerization catalyst under such conditions as to produce therefrom viscous polymers having a molecular weight distribution which substantially follows an arithmetic probability curve, separating from hydrocarbon material effluent from said polymerization a fraction within said limited viscosity range so produced and removing same from the process, separating also from said hydrocarbon effluent polymer fractions having viscosities above and below said limited viscosity range, and returning said last-named polymer fractions to said polymerization in admixture with additional amounts of said low boiling monomeric olefins.

9. The process for the polymerization of low boiling monomeric olefins to polymers within a limited viscosity range and suitable for use as a lubricating oil stock, which comprises polymerizing said olefins in liquid phase in the presence of a zirconium tetrachloride polymerization catalyst under such conditions as to produce therefrom viscous polymers having a molecular weight distribution which substantially follows an arithmetic probability curve, separating from hydrocarbon material effluent from said polymerization a fraction within said limited viscosity range so produced and removing same from the process, separating also from said hydrocarbon effluent polymer fractions having viscosities above and below said limited viscosity range, and returning said last-named polymer fractions to said polymerization in admixture with additional amounts of said low boiling monomeric olefins.

10. The process for the polymerization of low boiling monomeric olefins to polymers within a limited viscosity range and suitable for use as a lubricating oil stock, which comprises polymerizing said olefins in liquid phase in the presence of an aluminum chloride polymerization catalyst under such conditions as to produce therefrom viscous polymers having a molecular weight distribution which substantially follows an arithmetic probability curve, separating from hydrocarbon material effluent from said polymerization a fraction within said limited viscosity range so produced and removing same from the process, separating also from said hydrocarbon effluent polymer fractions having viscosities above and below said limited viscosity range, and returning said last-named polymer fractions to said polymerization in admixture with additional amounts of said low boiling monomeric olefins.

11. The process for the polymerization of low boiling monomeric olefins to polymers within a limited viscosity range and suitable for use as a lubricating oil stock, which comprises polymerizing said olefins in liquid phase in the presence of a titanium tetrachloride polymerization catalyst under such conditions as to produce therefrom viscous polymers having a molecular weight distribution which substantially follows an arithmetic probability curve, separating from hydrocarbon material effluent from said polymerization a fraction within said limited viscosity range so produced and removing same from the process, separating also from said hydrocarbon effluent polymer fractions having viscosities above and below said limited viscosity range, and returning said last-named polymer fractions to said polymerization in admixture with additional amounts of said low boiling monomeric olefins.

JAMES A. REID.